(12) United States Patent
Jacob et al.

(10) Patent No.: US 9,596,167 B1
(45) Date of Patent: *Mar. 14, 2017

(54) INTERNET PROTOCOL VIRTUAL PRIVATE NETWORK SERVICE PERFORMANCE MONITORING

(71) Applicant: Juniper Networks, Inc., Sunnyvale, CA (US)

(72) Inventors: Sudhin Jacob, Bangalore (IN); Deepesh Sudhakaran Nair, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 14/696,146

(22) Filed: Apr. 24, 2015

(51) Int. Cl.
*H04L 12/46* (2006.01)
*H04L 12/26* (2006.01)
(Continued)

(52) U.S. Cl.
CPC .............. *H04L 43/50* (2013.01); *H04L 12/18* (2013.01); *H04L 12/4641* (2013.01); *H04L 45/50* (2013.01); *H04L 45/745* (2013.01)

(58) Field of Classification Search
CPC . H04L 12/66; H04L 12/4641; H04L 41/0213; H04L 41/0631; H04L 41/16; H04L 41/22; H04L 43/026; H04L 43/04; H04L 43/0829; H04L 43/0835; H04L 43/0841; H04L 43/0864; H04L 43/10; H04L 43/50; H04L 45/00; H04L 45/02; H04L 45/04; H04L 45/50; H04L 45/60; H04L 45/502;
(Continued)

(56) References Cited

U.S. PATENT DOCUMENTS 7,212,530 B1 * 5/2007 Lim ..................... H04L 49/3009
370/392
7,239,630 B1 * 7/2007 Lim ....................... H04L 45/00
370/352
(Continued)

OTHER PUBLICATIONS

Rosen et al, "BGP/MPLS VPNs," RFC 2547, Network Working Group, The Internet Society, Mar. 1999, 25 pp.
(Continued)

*Primary Examiner* — Tri H Phan
(74) *Attorney, Agent, or Firm* — Shumaker & Sieffert, P.A.

(57) ABSTRACT

An example router includes a control unit configured to receive virtual private network (VPN) routing and forwarding table (VRF) configuration data defining a VRF for a VPN and VPN address space for the VPN, receive configuration data defining a measurement endpoint for measuring performance of a layer 3 (L3) service and associating the measurement endpoint with a remote measurement endpoint of a remote router. The control unit is configured to encapsulate, to generate a flow measurement packet, a layer 2 (L2) measurement packet in a layer 4 (L4) header and an L3 header, where the L3 header includes a source L3 address within the VPN address space and associated with the measurement endpoint, and where the L3 header includes a destination L3 address within the VPN address space and associated with the remote measurement endpoint. The control unit is configured to output the flow measurement packet to the remote router.

31 Claims, 6 Drawing Sheets

(51) Int. Cl.
  *H04L 12/741* (2013.01)
  *H04L 12/18* (2006.01)
  *H04L 12/723* (2013.01)

(58) Field of Classification Search
  CPC ......... H04L 63/00; H04L 69/00; H04L 12/18;
    H04L 12/46; H04L 12/703; H04L 12/741;
    H04L 12/707; H04L 12/713; H04L
    12/721; H04L 12/947; H04L 12/4633;
    H04L 29/06; H04L 41/08; H04L 41/0816;
    H04L 45/22; H04L 45/28; H04L 45/38;
    H04L 45/54; H04L 45/66; H04L 45/70;
    H04L 45/586; H04L 45/745; H04L
    47/825; H04L 49/25; H04L 69/22
  See application file for complete search history.

(56) References Cited

U.S. PATENT DOCUMENTS

| | | | |
|---|---|---|---|
| 7,623,449 B2 | 11/2009 | Shabtay | |
| 7,801,974 B2* | 9/2010 | Yang | H04L 12/4641 370/398 |
| 7,804,766 B2* | 9/2010 | Qian | H04L 41/0631 370/216 |
| 7,898,965 B2 | 3/2011 | Mohan et al. | |
| 9,055,000 B1* | 6/2015 | Ghosh | H04L 45/66 |
| 9,306,830 B2* | 4/2016 | Robitaille | H04L 43/0829 |
| 2005/0188106 A1* | 8/2005 | Pirbhai | H04L 45/54 709/238 |
| 2005/0281259 A1 | 12/2005 | Mitchell | |
| 2007/0086448 A1* | 4/2007 | Hu | H04L 12/4641 370/389 |
| 2009/0129260 A1* | 5/2009 | Qian | H04L 41/0631 370/216 |
| 2014/0211636 A1 | 7/2014 | Robitaille | |
| 2015/0188769 A1* | 7/2015 | Gu | H04L 12/4641 726/3 |
| 2016/0294987 A1* | 10/2016 | Tian | H04L 69/22 |

OTHER PUBLICATIONS

Rosen et al, "BGP/MPLS IP Virtual Private Networks (VPNs)," RFC 4364, Network Working Group, The Internet Society, Feb. 2006, 47 pp.

Rosen et al, "Multicast in MPLS/BGP IP VPNs," Network Working Group, IETF Trust, May 10, 2010, 27 pp.

International Telecommunication Union Telecommunication Standardization Section (ITU-T) recommendation Y.1731 "OAM functions and mechanisms for Ethernet based networks," May 2006, 80 pp.

U.S. Appl. No. 14/499,998, by Sasha Cirkovic et al., filed Sep. 29, 2014.

* cited by examiner

INTERNET PROTOCOL VIRTUAL PRIVATE NETWORK SERVICE PERFORMANCE MONITORING

TECHNICAL FIELD

This disclosure relates to computer networks and, more specifically, to monitoring computer network performance.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a common L2 networks is an Ethernet network in which end point devices (e.g., servers, printers, computers) are connected by one or more Ethernet switches or other L2 network devices. The Ethernet switches forward Ethernet frames, also referred to as L2 communications or L2 packets to devices within the network. As the Ethernet switches forward the Ethernet frames the Ethernet switches learn L2 state information for the L2 network, including media access control (MAC) addressing information for the devices within the network and the physical ports through which the devices are reachable. The Ethernet switches typically store the MAC addressing information in MAC tables associated with each of their physical interfaces. When forwarding an individual Ethernet frame, an ingress port of an Ethernet switch typically multicasts the Ethernet frame to all of the other physical ports of the switch unless the Ethernet switch has learned the specific physical port through which the destination MAC address devices is reachable. In this case, the Ethernet switch forwards a single copy of the Ethernet frame out the associated physical port.

Network service providers that offer L2 connectively typically enter into a service-level agreement (SLA) with their customers that defines both the services that are to be provided and a promised level of performance for the services. The performance level specifies measurable metrics such as bandwidth guarantees, up-time percentages, and the number of serviceable users. Another metric commonly defined in an SLA is frame loss performance, which is typically expressed as a ratio of the number of service frames (e.g., encapsulated L2 communications) not delivered to the total number of service frames during a particular time interval.

To monitor L2 performance metrics and verify operation, network administrators implement a process referred to as Operations, Administration and Maintenance (OAM), which generally provides the activities, tools, standards and other techniques that involve operating, administering and maintaining connectivity in the L2 computer network. One such OAM tool, referred to as OAM Frame Loss Measurement, standardizes mechanisms for loss measurement in an Ethernet computer network and is described in the Internal Telecommunication Union Telecommunication Standardization Section (ITU-T) recommendation Y.1731, "OAM functions and mechanisms for Ethernet based networks," May, 2006, which is incorporated by reference herein in its entirety. OAM Frame Loss Measurement as described in ITU-T Y.1731, Section 8, defines the Frame Loss Ratio performance metric to apply to Ethernet frames admitted at the ingress L2 flow point of an L2 connection and delivered to the egress L2 flow point of the L2 connection.

SUMMARY

In general, techniques are described for measuring the service performance of an Internet Protocol (IP)-Virtual Private Networking (VPN) (IP-VPN) service that interconnects two or more customer networks. The techniques may be useful for network service providers offering systems that provide connectivity between multiple, geographically separate customer networks. That is, separate customer networks (or "customer network sites") may be interconnected by the service provider to provide layer 3 (L3 or "network layer") connectivity as though the customer network sites were directly connected.

In some examples, an administrator or other entity may configure service monitoring between endpoints that cooperatively offer an IP service, such as a layer 3 virtual private network (L3VPN) or IP-VPN, to interconnect customer networks coupled to the endpoints. As part of the configuration, the administrator may configure a measurement flow to transport layer 2 (L2) measurement packets between the endpoints to allow the endpoints to leverage L2 performance monitoring techniques. The measurement flow may be defined by header information, such as the 5-tuple that specifies the protocol, source IP address, destination IP address, source port, and destination port for a packet. The header information uniquely identifies flow measurement packets for the measurement flow and enables the endpoints to tunnel L2 measurement packets using the flow measurement packets to provide point-to-point (P2P) or point-to-multipoint (P2MP) connectivity for an L2 monitoring service using the measurement flow.

In some examples, the techniques may leverage the Y.1731 performance monitoring (PM) protocol, in which case actual packet count and timestamps are related for the measurement flows. In particular, elements of an IP/MPLS network that constitute the service provider core network may route Y.1731 packet data units (PDUs) encapsulated in UDP/IP packets. In this way, the techniques may provide accurate and precise SLA measurement tools for IP/IP-VPN services by leveraging well-known techniques for validating L2/Ethernet services (e.g., Y.1731).

Various techniques of this disclosure may improve the ability of the service provider to monitor performance and usage metrics for IP services, including multicast as well as unicast services. In some aspects, the techniques described herein enable the service provider to monitor performance and/or bandwidth consumption in IP multicast virtual private networks (or "IP-MVPNs"). Certain IP-MVPN monitoring techniques of this disclosure may define a protocol that enables monitoring of bandwidth consumption and packet loss over particular multicast channels. For instance, the IP-MVPN monitoring techniques may correlate a multicast channel to a multicast group address or group identifier and may consolidate all traffic monitoring data associated with the multicast group address or group identifier.

In some aspects, the techniques of this disclosure are directed to monitoring performance and/or bandwidth consumption for a particular virtual routing and forwarding table (VRF) configured on a router and attached to a customer site. For instance, the VRF monitoring techniques of this disclosure may monitor traffic for a VRF using a Multiprotocol Label Switching (MPLS) label of labeled packets forwarded according to the VRF and in some instances using an MPLS label of labeled packets received at a router, where the MPLS label of labeled packets received at the router identifies the VRF. The techniques may, in some cases, leverage aspects of existing standards in defining one or more new protocols for service monitoring of multicast and/or unicast traffic.

In one example, a method includes receiving, by a router, virtual private network (VPN) routing and forwarding table (VRF) configuration data defining a VRF for a VPN and a VPN address space for the VPN, and receiving, by the router, configuration data defining a measurement endpoint for measuring performance of a layer 3 (L3) service and associating the measurement endpoint with a remote measurement endpoint of a remote router. The method may further include encapsulating, by the router, to generate a flow measurement packet, a layer 2 (L2) measurement packet in a layer 4 (L4) header and an L3 header, where the L3 header comprises a source L3 address within the VPN address space and associated with the measurement endpoint, and where the L3 header comprises a destination L3 address within the VPN address space and associated with the remote measurement endpoint. The method may further include outputting, by the router, the flow measurement packet to the remote router.

In another example, a router includes a memory and a control unit including a processor. The control unit is configured to receive virtual private network (VPN) routing and forwarding table (VRF) configuration data defining a VRF for a VPN and a VPN address space for the VPN, and to receive configuration data defining a measurement endpoint for measuring performance of a layer 3 (L3) service and associating the measurement endpoint with a remote measurement endpoint of a remote router. The control unit is further configured to encapsulate, to generate a flow measurement packet, a layer 2 (L2) measurement packet in a layer 4 (L4) header and an L3 header, where the L3 header comprises a source L3 address within the VPN address space and associated with the measurement endpoint, and where the L3 header comprises a destination L3 address within the VPN address space and associated with the remote measurement endpoint. The control unit is further configured to output the flow measurement packet to the remote router.

In another example, a non-transitory computer-readable storage medium is encoded with instructions. When executed, the instructions cause one or more processors of a router to receive virtual private network (VPN) routing and forwarding table (VRF) configuration data defining a VRF for a VPN and a VPN address space for the VPN, and to receive configuration data defining a measurement endpoint for measuring performance of a layer 3 (L3) service and associating the measurement endpoint with a remote measurement endpoint of a remote router. The instructions, when executed, further cause the one or more processors of the router to encapsulate, to generate a flow measurement packet, a layer 2 (L2) measurement packet in a layer 4 (L4) header and an L3 header, where the L3 header comprises a source L3 address within the VPN address space and associated with the measurement endpoint, and where the L3 header comprises a destination L3 address within the VPN address space and associated with the remote measurement endpoint. The instructions, when executed, further cause the one or more processors of the router to output the flow measurement packet to the remote router.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
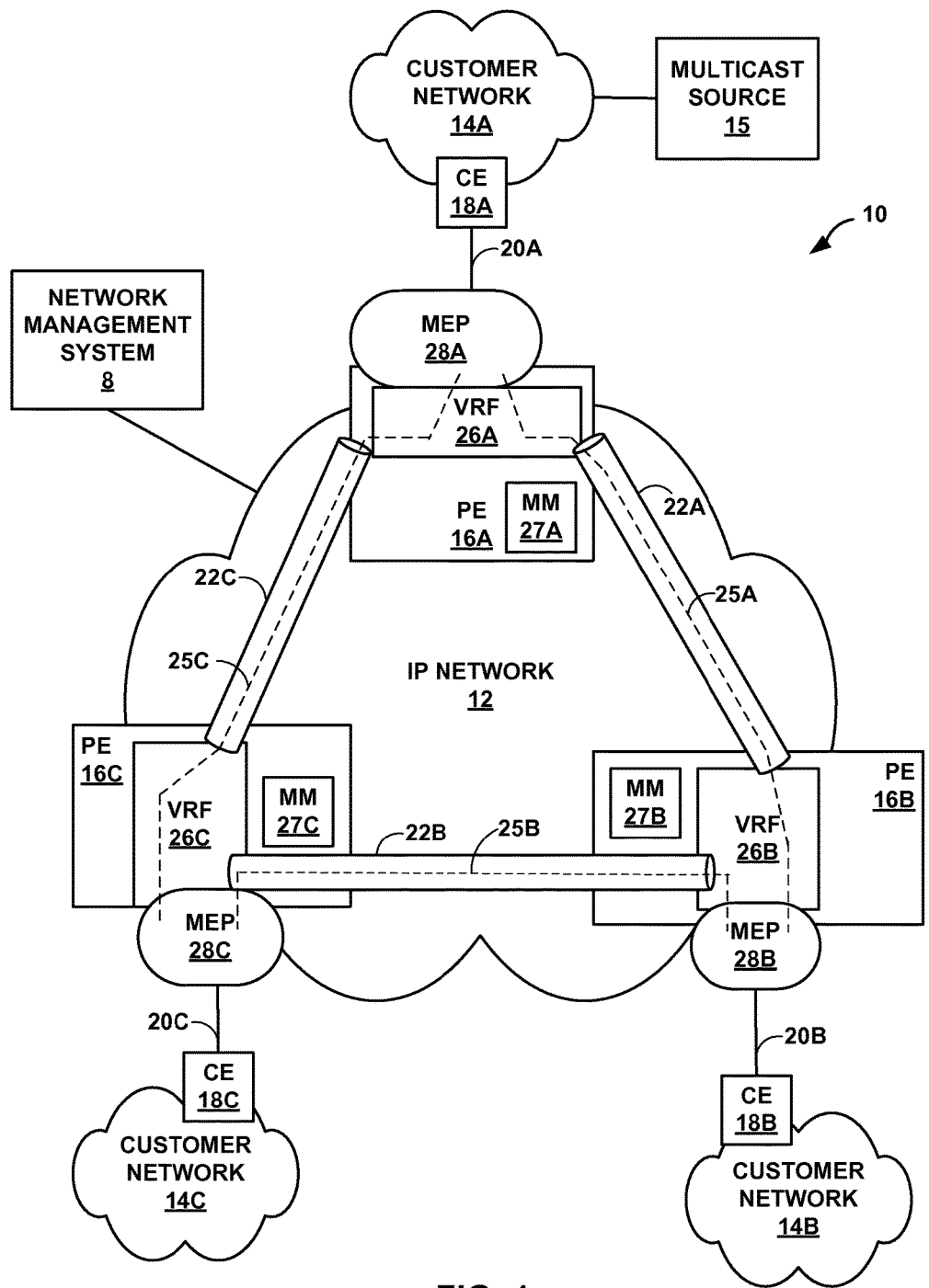
FIG. 1 is a block diagram illustrating an example network system in which one or more network devices monitor the performance of service traffic for an IP-VPN or IP-MVPN service at service endpoints according to techniques described herein.

FIG. 1 is a block diagram illustrating an example network system 10 in which one or more network devices monitor the performance of service traffic for an IP-VPN or IP-MVPN service at service endpoints according to techniques described herein. As shown in FIG. 1, network system 10 includes an IP network 12 and customer networks 14A-14C ("customer networks 14"). IP network 12 may represent a public network that is owned and operated by a service provider to interconnect a plurality of edge networks, such as customer networks 14. As a result, IP network 12 may be referred to herein as a Service Provider (SP) network or, alternatively, as a "core network" in that IP network 12 acts as a core to interconnect access networks that service customer networks 14. Example service providers include Verizon Communications, Inc. or American Telephone & Telegraph (AT&T™) Company. In some examples, IP network 12 may represent a Multiprotocol Label Switching (MPLS) network.

In the illustrated instance, IP network 12 provides an IP service to transparently interconnect customer networks 14 at the IP layer (also referred to as layer 3 or the network layer) such that, from the perspective of customer networks 14, each of customer networks 14 appears to have IP connectivity with one another. The IP service operates to provide L3/IP connectivity and may be alternatively referred to as a virtual private network (VPN), an IP-VPN, a provider-provided VPN (PPVPN), or a virtual private routed network (VPRN), for example. Moreover, different IP service instances, which may include corresponding virtual routing and forwarding tables (VRFs), may be maintained by PE routers 16 at a given time. In the illustrated example, VRFs 26A-26C (collectively, "VRFs 26") implement a VPN for the IP service interconnecting customer networks 14. Furthermore, although illustrated as three provider edge routers 16A-16C interconnecting three customer networks 14A-14C, the techniques are applicable to other topologies. For example, a single PE router may provide an IP service to two or more customer networks 14, and so forth.

Customer networks 14 may each represent an IP network owned and operated by a large entity, such as a university, corporation, business, or other facility or enterprise. In some instances, a single large entity may own and operate two or more of customer networks 14. The entity may then contract with IP network 12 to provide a service offered by IP network 12, in order to transparently interconnect these customer networks 14 in the manner described above.

Each of customer networks 14 may operate according to a wide variety of network protocols, such as any of the 802.3X family of network protocols related to the Ethernet protocol, any of the 802.1X family of wireless networking protocols, an Internet Protocol (IP) protocol, and a Transmission Control Protocol (TCP). Moreover, one or more of customer networks 14 may comprise a Virtual Private Network (VPN), a Large Area Network (LAN), or a Wide Area Network (WAN). Although not shown in FIG. 1 for ease of illustration purposes, each of customer networks 14 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection.

IP network 12 may include a plurality of provider edge (PE) routers 16A-16C ("PEs 16") that reside at an edge of IP network 12. While discussed herein with respect to a particular network device, i.e., a router, PEs 16 may each represent any network device that interfaces with a network, such as one of customer networks 14, to route, switch, bridge or otherwise forward network traffic directed to or originating from the network. For example, PEs 16 may each represent, in certain instances, one or more of a switch, a hub, a bridge device, or any other network device capable of providing the IP service.

PEs 16 may implement the IP service using any of a number of different IP service technologies, such as Border Gateway Protocol/MPLS VPNs (described in Rosen and Rekhter, "BGP/MPLS VPNs," Request for Comments 2547, Network Working Group of the Internet Engineering Task Force, March 1999, which is incorporated by reference herein in its entirety), and BGP/MPLS IP VPNs (described in Rosen and Rekhter, "BGP/MPLS IP Virtual Private Networks," Request for Comments 4364, Network Working Group of the Internet Engineering Task Force, February 2006, which is incorporated by reference herein in its entirety). In some cases, PEs 16 provide a native IP service in which customer networks 14 utilize the default routing table of IP network 12.

Each of customer networks 14 may also include a respective one of a plurality of customer edge (CE) routers 18A-18C ("CEs 18") that reside at an edge of the corresponding one of customer networks 14. Like PEs 16, CEs 18, while discussed herein with respect to a particular network device, i.e., a router, may each represent any network device that interfaces with a network, such as IP network 12, to route network traffic directed to or originating from the network. For example, CEs 18 may each represent, in certain instances, one or more of a switch, a hub, a bridge device, or any other network device capable of accessing the IP service.

PEs 16 couple to respective CEs 18 of customer networks 14 via attachment circuits 20A-20C ("ACs 20"). Each of ACs 20 is a physical and/or virtual circuit attaching one of CEs 18 to one of PEs 16 and may be, for example, a Frame Relay data link connection identifier, an asynchronous transfer mode (ATM) Virtual Path Identifier (VPI)/Virtual Channel Identifier (VCI), an Ethernet port, a VLAN, a Point-to-Point Protocol (PPP) connection on a physical interface, a PPP session from an L2 Tunneling Protocol (L2TP) tunnel, or a Multiprotocol Label Switching (MPLS) Label Switched Path (LSP), a Generic Route Encapsulation (GRE) tunnel, or another interface to the IP service. Attachment circuits 20 may each comprise a direct link or an access network.

In some examples, customer networks 14 may represent elements of a mobile backhaul network in which routers and other elements of the mobile backhaul network connect cellular access points such as eNodeB's to SGWs/SGSNs and to one another via the S1 and X2 interfaces, respectively. In such examples, IP network 12 may represent a mobile network core, with PEs 16 operating as SGWs/SGSNs for the mobile service provider network.

In some examples, PEs 16 use virtual routing and forwarding tables (VRFs) 26A-26C to route packets for the IP service, originated by any of customer networks 14, among the customer networks 14. More particular, tunnels 22 transport service packets for the IP service that encapsulate IP traffic among customer networks 14. PEs 16 receive such IP traffic on attachment circuits 20 and encapsulate the traffic for transport by tunnels 22 to remote PEs 16. Tunnel encapsulation headers for the IP traffic, and associated with tunnels 22, may serve to identify the IP service (e.g., an IP-VPN) to the receiving PEs 16 to enable the PEs 16 to route the traffic using the appropriate VRF, which in the illustrated example is VRFs 26.

Each of tunnels 22 may operate as a packet-switched network (PSN) tunnel that connects a pair of PEs 16. For example, customer IP traffic may be encapsulated for transport along tunnel 22A in a transport tunnel established between PEs 16A, 16B. While generally described in this document as an LSP, transport tunnels may also include GRE, L2TP, and IPsec tunnels, for example.

An administrator of IP network 12 may configure or PEs 16 may cooperatively establish tunnels 22, and once established, PEs 16 begin providing the IP service among customer networks 14 using tunnels 22, thus implementing a service that terminates at the edges. Each of PEs 16 for each of the tunnels 22 endpoints may be configured with a particular MPLS label that identifies received packets for the IP service in the data plane. For example, PE 16A may be configured to attach pseudowire label "100" to specify tunnel 22A packets, associated with VRF 26B, to PE 16B. PE 16A may be further configured with MPLS label "200" that, when attached to packets received from PE 16B, identifies the packets as tunnel 22A packets associated with VRF 26A. In this way, PEs 16 that receive labeled traffic may identify the appropriate VRF 26 with which to forward the IP service traffic among customer networks 14.

Tunnels 22 terminate at logical ports within PEs 16 that couple attachment circuits 20 to tunnels 22 and are referred to herein as "service endpoints" with respect to the IP service. Service endpoints that receive IP traffic from attachment circuits 20 are ingress service endpoints, while service endpoints that output IP traffic to attachment circuits 20 are egress service endpoints. A service endpoint, in other words, is a logical port or interface of one of PEs 16 that connects one of attachment circuits 20 to one or more tunnels 22. Two service endpoints of different ones of PEs 16 may transparently connect two attachment circuits 20 and thereby emulate a port-to-port or port-to-multiport IP service. However, service endpoints may in some contexts be understood as extending over respective attachment circuits 20 to corresponding customer networks 14.

PEs 16 may, in accordance with aspects of this disclosure, utilize the IP service to exchange bidirectional communications, called out as measurement flows 25, using tunnels 22 that PEs 16 use to implement the IP service. An administrator may configure, for PEs 16, respective maintenance association endpoints (MEPs) 28 that define performance monitoring for the IP service by binding measurement flows 25 to the MEPs 28. Each of measurement flows 25 may include measurement packets to enable loss measurement and/or delay measurement at MEPs 28 for the IP service implemented by PEs 16 for customer networks 14. MEPs 28 may be members of the same maintenance entity group (MEG) for monitoring a performance of the IP service. Although described with respect to MEPs 28 and accordingly using terminology that comports with ITU-T Y.1731, incorporated above, the techniques are not limited thereto, and MEPs 28 may represent any association between PEs 16 for the purpose of monitoring the performance of the IP service according to techniques described herein.

Each of PEs 16 includes a corresponding one of measurement modules 27A-27C (illustrated as "MMs 27"), which represent PE 16 components that initiate and process flow measurement packets to perform performance monitoring for MEPs 28. In various instances, PEs 16 may implement multicast and/or unicast communications. As used herein, multicast traffic may refer to a "one-to-many" or "many-to-many" transmission of the same data, which is addressed and forwarded to multiple destination devices concurrently. Unicast traffic may refer a "one to one" communication of data, such as communication between a server and a client device.

In some aspects of this disclosure, multicast source device 15 ("multicast source 15") of customer network 14A is a multicast traffic source that makes use of an IP-MVPN configured in IP network 12 including PEs 16 to efficiently deliver multicast traffic to multicast destinations located in at least one of customer networks 14B and 14C. In such aspects, VRFs 26 represent multicast VRFs each having a multicast routing table for multicast control and routing/forwarding. The IP-MPVN may make use of one of multicast distribution trees (MDTs) that span core (P) routers of IP network 12 (not shown) and PEs 16. Additional details regarding example implementations of MVPNs are found in Rosen et al., "Multicast in MPLS/BGP IP VPNs," Network Internet Engineering Task Force (IETF) Network Working Group, May 10, 2010, which is incorporated by reference herein in its entirety.

In some aspects, PEs 16 advertise and install labeled routes for destination prefixes in customer networks 14. A labeled route specifies at least a destination prefix for the IP-VPN (or "customer VPN"), a next hop PE 16, and the assigned MPLS label. For example, PEs 16 may assign an MPLS label to each route within an IP-VPN provided by VRFs 26. The MPLS label identifies, to the PE 16 that assigned the label and advertised the labeled route, a VRF configured on the PE 16. Before transmitting a customer packet across IP network 12 (the service provider backbone), the PE 16 encapsulates the packet with the MPLS label that corresponds to the route in the IP-VPN that is a best match for the packet destination address. The PE 16 may further encapsulate this labeled packet with a tunnel header (e.g., LSP header, GRE header, etc.) for one of tunnels 22 to tunnel the labeled packet to the destination PE that advertised the best match route.

Traditional IP-VPN and IP-MVPN networks do not provide effective measurement of IP-MVPN multicast packet or unicast VRF-specific packet loss and measurement of bandwidth consumed by a particular customer site or customer channel/multicast group (e.g., by one of VRFs 26). More specifically, currently available IP-MVPN technologies do not provide mechanisms by which VRFs 26 may: measure performance for the multicast packets flowing through the service provider network, measure bandwidth utilization for an individual channel, and plot the performance or bandwidth utilization graph using a network management system (NMS).

Aspects of this disclosure are directed to enabling loss measurement, monitoring of bandwidth utilization, and monitoring of peak hour utilization in IP-MVPNs. In some examples, VRFs 26 utilize certain techniques of this disclosure to implement a granular (or "fine-grained") level of detail with respect to the traffic and/or bandwidth usage over IP-MVPNs. According to some implementations, VRFs 26 may generate and/or analyze granular information with respect to which customer site is consuming or otherwise using the network bandwidth. In various use case scenarios, bandwidth usage information obtained by VRFs 26 using the techniques of this disclosure may be used for billing and other accounting activities, or to determine levels of bandwidth usage for particular channels (e.g., multicast groups). Additionally, an administrator or service provider may use bandwidth usage data obtained by VRFs 26 using the techniques described herein to determine subscription levels with respect to particular channels in an IP-MVPN network.

In one example use case, a single customer may be associated with VRFs 26 included in PEs 16. IP-MVPN techniques of this disclosure may enable measuring metrics for the multicast traffic flow issued by multicast source 15 and forwarded by VRF 26A to VRFs 26B and 26C, respectively. Various loss measurement and bandwidth measurement techniques of this disclosure are based on selecting IP addresses for customer-facing interfaces to assign to MEPs 28 based on connections to respective CEs 18. E.g., MEP 28C is selected as the CE 18C-facing interface IP address of PE 16C, the IP address being drawn from the VPN address space for VRF 26C. According to some aspects of the protocol provided by the techniques of this disclosure, to measure multicast group traffic performance, PEs 16 are configured to use the Y.1731 payload structure in combination with multicast customer group traffic information. More specifically, PEs 16 may combine Y.1731 loss measurement message/reply (LMM/LMR) packets with a multicast group address that identifies a multicast group; UDP ports; and a source IP (SIP) and destination IP (DIP) of CE 18-facing interfaces for VRFs 26.

PEs 16 are configured to use traffic of measurement flows 25 to implement performance monitoring and bandwidth monitoring, in accordance with aspects of this disclosure. In various examples, VRF 26A may be a "master" VRF and with respect to the customer sites associated with VRFs 26B and 26C. The source VRF (VRF 26A, in this example) encapsulates a loss measurement message as a payload in a measurement packet, and transmits the measurement packet over respective measurement flows 25A and 25C. In turn, the respective destination VRF 26B or 26C decapsulates or "strips" the payload of the received measurement packet received over the respective measurement flow 25A or 25C, and checks the multicast group ID (e.g., multicast group address) of the measurement packet to determine the number of packets received at the VRF for that particular multicast group. Additionally, the respective destination VRF 26B or 26C copies the number of received packets (or "counter" value) to a loss measurement reply (LMR) message. In turn, the respective destination VRF 26B or 26C encapsulate the LMR message as the payload of another (e.g., "return") measurement packet that the respective VRF 26B or 26C transmits back to VRF 26A. More specifically, destination VRFs 26B and/or 26C may encapsulate the LMR payload using traffic details for the measurement flow 25A or 25C, and send the encapsulated LMR payload back to the VRF 26A of PE 16A which initiated the measurement packet encapsulating the LMM message.

According to one or more IP-MVPN monitoring techniques of this disclosure, a measurement modules 27 are configured to gather information from the forwarding plane (e.g., a set of one or more packet forwarding engine (PFE)) that counts data or packets transmitted and/or received for a customer multicast group for an IP-MVPN. More specifically, in accordance with the IP-MVPN monitoring techniques of this disclosure, the MM 27A of VRF 26A is configured to gather information associated with multicast groups of VRFs 26. For instance, MM 27A may determine a transmit counter value for a multicast group of the IP-MVPN of VRF 26A, where the transmit counter value indicates a number of packets or an amount of data sent by PE 16A to the multicast group and according to VRF 26A. MM 27A may set a "Txfcf" counter value of the encapsulated LMM payload to the transmit counter value. Additionally, MM 27A initializes two remaining counter values (denoted by "Rxfcf" and "Txfcb") to values of 0, in the encapsulated LMM payload. MM 27A may then inject the multicast flow measurement packet into VRF 26A for forwarding according to the VRF 26A routing table. Further details of LMM/LMR encapsulation are illustrated in FIGS. 3-6 and described in more detail below.

Upon receipt of a multicast or measurement packet, VRFs 26B and 26C of respective destination PEs 16B and 16C decapsulate or strip the L4/L3 header of the received measurement packet, whether a multicast flow measurement packet or a unicast flow measurement packet for VRF-based performance monitoring. Additionally, in the case of multicast flow measurement packets, VRFs 26B and 26C identify the multicast group or channel specified in the multicast flow measurement packets. For example, the respective destination VRF 26B or 26C identifies the multicast group/channel using a "group ID" or "multicast group address" field of the measurement packet header. A multicast group address may refer to the G parameter according to Protocol-Independent Multicast (PIM). In turn, VRFs 26B and 26C obtain the traffic details of the respective multicast group/channel from data obtained from the forwarding plane. More specifically, the respective destination VRF 26B or 26C obtains, from the forwarding plane, a Txfcf value included in the LMM payload. As described above, the Txfcf value indicates a count of measurement packets transmitted by the source VRF 26A over respective measurement flows 25A and 25C.

For each measurement packet received over measurement flows 25A and 25C, MMs 27B and 27C may generate a corresponding (e.g., "return") measurement packet to transmit back to VRF 26A, via respective measurement flows 25A and 25C. More specifically, VRFs 26B and 26C generate each return measurement packet by encapsulating a corresponding loss management reply (LMR) message using header information that is reciprocal to the header information of the last measurement message received from source VRF 26A. To generate each return measurement packet, MMs 27B and 27C populate the LMR payload with counter values that indicate performance metrics (or performance statistics) collected from measurement flows 25A and 25C and from the forwarding planes of PEs 16B and 16C for VRFs 26 and 26B. MMs 27B and 27C may copy the Txfcf value of the last received LMM payload into the LMR payload of the corresponding return measurement packet. By copying the Txfcf of a received LMM payload into the corresponding LMR payload of a return measurement packet, VRFs 26B and 26C may enable the source VRF 26A to match performance statistics with the correct stage of the performance monitoring process.

Additionally, MMs 27B and 27C may populate the LMR packet using received packet count (the Rxfcf value) obtained from the forwarding plane for the multicast group of the VRF. More specifically, the MMs 27B and 27C associated with destination VRFs 26B or 26C may update the Rxfcf value (which the source VRF 26A had set to a value of zero) to match the current value of the received packet counter for the respective measurement flow 25A or 25C. Thus, VRFs 26B and 26C are configured to generate return measurement packets that include a Txfcf value copied the most recently received LMM payload, and an Rxfcf value that indicates the current number of measurement packets received via the respective measurement flow 25A or 25C. In this manner, the multicast performance monitoring techniques enable multicast destination VRFs 26B and 26C to correlate the current number of measurement packets transmitted by source VRF 26A and the current number of measurement packets actually received.

To generate a return measurement packet, any of MMs 27B and 27C may encapsulate an LMR payload using a source IP (SIP) address of the interface that faces the respective CE 14B or 14C attached to the VRF 26B or 26C. To encapsulate the LMR payload, MMs 27B and 27C add a field for a destination IP (DIP) address, which reflects the source IP address from which the most recent measurement packet (with the corresponding LMM payload) was received. In the use case scenario described herein, MMs 27B and 27C populate the DIP field of each return measurement packet with the IP address of the CE-facing interface of VRF 26A. MMs 27B and 27C encapsulate each LMR payload by further adding a field for the group IP address for the multicast channel. By including the group IP address for the multicast channel being monitored via measurement flows 25A and 25C, VRFs 26B and 26B may compartmentalize performance measurement metrics within the relevant multicast channel/group. In this manner, the IP-MVPN monitoring techniques of this disclosure enable MMs 27 to delineate performance statistics (or "performance monitoring statistics") on a channel-by-channel basis, using known packet structures and readily-available header information.

Upon receiving a return measurement packet that includes an encapsulated LMR payload, the MM 27A decapsulates the LMR payload, and analyzes the Rxfcf value included in the LMR payload. In turn, MM 27A calculates any possible packet loss by subtracting the received Rxfcf value from the corresponding Txfcf value that was copied into the same LMR payload. Additionally, MM 27A may implement certain techniques of this disclosure to determine and/or gauge the bandwidth usage of a particular multicast group over a period of time. More specifically, MM 27A may use the Rxfcf value and corresponding Txfcf value in a particular return measurement packet to determine bandwidth usage for each of destination VRFs 26B and 26C. MM 27A may plot the bandwidth usage over a period of time, or send the bandwidth usage statistics for VRFs 26A and 26B to a network management service (NMS) for further processing. It will be appreciated that MMs 27 may implement the bandwidth monitoring techniques of this disclosure with respect to point-to-point or point-to-multipoint communications according to VRFs 26.

According to one example of the bandwidth measurement techniques of this disclosure, MM 27A records packet rates at a predetermined time interval, such as at every 10 minutes. In one example, MM 27A is configured to record the packet rates for at least six entries in a buffer. After six entries are recorded, MM 27A may then write the buffered entries to a file, upon receiving entries subsequent to the sixth entry. Additionally, MM 27A may overwrite the file at predetermined time intervals, such as at intervals of every 48 hours. According to some examples in accordance with this disclosure, an NMS may be configured to extract the data written to the file, prior to MM 27A overwriting the data of the file.

Table 1 below illustrates an example use case scenario of bandwidth utilization monitoring implemented by PEs 16, 'PE1' referring to PE 16A and 'PE2' referring to PE 16B. In the example illustrated in Table 1, the multicast group bandwidth utilization for VRFs 28A and 28B ("vrfA of PE1" and "vrfA of PE2") is calculated using the formula (P12'−P12)/3600. The resulting bandwidth usage may be expressed in various units, such as packets per second (pps) or bytes per second. In various examples, MM 27A or another device such as NMS 8 (e.g., an administrator-level device) may calculate the bandwidth utilization over a period of time and tabulate the results or plot the results on a graph. In turn, a service provider may use the tabulated or plotted data to discern and analyze the traffic rates associated with each customer site, e.g., with each of VRFs 26B and 26C of PEs 16B and 16C. In some use case scenarios, the service provider may use the bandwidth usage statistics compiled by MM 27A to assign customer status levels to each customer site (in this particular example the sites associated with destination VRFs 26B and 26C). As one example, the service provider may base the determination of preferred customer levels (e.g., "platinum status," "gold status," and so on) on the bandwidth usage statistics gathered and compiled by MM 27A.

TABLE 1

| Interval | Txfcf (packets transmitted for a customer multicast group from vrfA of PE1 to PE2 vrfA) | Rxfcf( multicast packets received for a particular group at PE2 from vrfA of PE1 ) |
|---|---|---|
| 1 | P12 | P12 |
| 2 | P12' | P12' |
| 3 | P12" | P12" |

Additionally, certain techniques of this disclosure are applicable to scenarios of VRF-specific unicast communications (i.e. one-to-one or point-to-point). In one example explained with respect to FIG. 1, VRFs 26A and 26B may implement unicast communications. For instance, VRF 26A may receive traffic from a server of customer site 14A and forward the traffic to PE 16B for sending to a client in customer site 14B according to VRF 26B. In examples where MMs 27A and 27B implement the unicast performance monitoring and/or the unicast bandwidth monitoring techniques of this disclosure, MEPs 28A and 28B serve as endpoints. The IP addresses of the respective interfaces of MEPs 28A and 28B that face CEs 18A and 18B may serve as the IP address/loopback address with respect to endpoint configuration. In other words, the unicast-based techniques of this disclosure enable MMs 27A and 27B to measure and/or analyze point-to-point packet loss, bandwidth consumption over a period, traffic rates, etc. based on the CE-facing interfaces of VRFs 26 and 28B selected for MEPs 28A and 28B. MMs 27A and 27B may implement the unicast-based monitoring techniques of this disclosure to generate a protocol that leverages the Y.1731 payload structure to carry traffic information. To implement the unicast-based monitoring techniques described herein, MMs 27A and 27B may encapsulate Y.1731 LMM packets using UDP port information and SIP and DIP information of the configured MEPs 28A and 28B.

According to the unicast-based monitoring techniques of this disclosure, counters of the PEs 16A and 16B are configured to count labeled packets or an amount of data sent and received according to respective VRFs 26A and 26B. For example, a transmit counter of PE 16A may be configured to count all packets sent by PE 16A according to VRF 26A and having a label that identifies VRF 26B to PE 16B. PE 16A may also include a receive counter configured to count all packets received by PE 16A and having a label that identifies VRF 26A. PE 16B is configured with similar counters. PEs 16 may have corresponding counters for each VRF for with which the PE communicates, local and/or remote.

MMs 27 may monitor VRF-specific traffic using the above-described counters and techniques described herein. MMs 27 may establish measurement flows 25 to perform VRF-based performance monitoring at the VRF level of granularity for PEs 16. To do so, MMs 27 use the above-described counters that monitor labeled traffic. Similar to the multicast-based monitoring techniques described above, MM 27A embeds a Txfcf value in a flow measurement packet. However, MM 27A in this aspect uses the Txfcf value to indicate the count of transmitted packets encapsulated using an MPLS label (e.g., label L1) that identifies VRF 26B. Additionally, MM 27A may set the remaining counter values (Rxfcf and Txfcb) to default values of zero, and set the source IP (SIP) field with the IP address of the CE-facing interface selected for MEP 28A and also set the destination IP (DIP) field to the IP address of the CE-facing interface selected for MEP 28A. MM 27A injects the flow measurement packet to VRF 26A, and PE 16A outputs the labeled flow measurement packet to PE 16B according to VRF 26A. The flow measurement packet may be labeled with an MPLS label that identifies VRF 26B to PE 16B.

Upon receiving a flow measurement packet for VRF-label-based measurement, MM 27B may decapsulate or strip the L4/L3 headers from the LMM payload. MM 27B may determine the VRF 26B being monitored using the label for the labeled flow measurement packet. Additionally, MM 27B may obtain the Txfcf counter value indicated in each LMM payload. and copy the Txfcf counter value to the corresponding return measurement packet. More specifically, and in a manner similar to that described with respect to the multicast monitoring techniques of this disclosure, MM 27B copies the Txfcf counter into an LMR message, which MM 27B encapsulates to form the return flow measurement packet. MM 27B may use a different inner MPLS label (e.g., L2) for return flow measurement packets that MM 27B transmits back to PE 16A in order to identify VRF 26A to PE 16A. To generate return flow measurement packet, MM 27B is configured to collect statistics for received traffic having inner label L1 of PE 16B. Using the collected statistics, VRF 26B may determine the Rxfcf and Txfcb values to be embedded in return traffic with the L2 inner label. More specifically, MM 27B copies the Txfcb of the received flow measurement packet's LMM payload into the corresponding return flow measurement packet's LMR payload. Additionally, MM 27B embeds the most recent Rxfcb value indicating the number of received L1 packets for VRF 26B in the LMR payload of the corresponding return flow measurement packet. Thus, MM 27B includes the relevant counter values to a return flow measurement packet that PE 16B transmits to PE 16A. MM 27B is configured to encapsulate L2 PDUs including the LMR payload with L4/L3 headers for a measurement flow and to send such flow measurement packets to VRF 26A over the unicast channel. As one example, MM 27B sets the SIP of a return flow measurement packet to PE 16A by copying the DIP of the received (corresponding) flow measurement packet generated by MM 27A and sent to PE 16B by PE 16A. MM 27B sets the DIP of each return flow measurement packet by copying the SIP of the received (corresponding) flow measurement packet. MM 27B also includes UDP port information for both source and destination UDP ports to the header of the L2 packet, identifying the return flow measurement packet as belonging to a measurement flow, and sends the packet to PE 16A with the L2 inner label identifying VRF 26A. Upon receipt of the return flow measurement packet, MM 27A extracts the Rxfcf counter value. By correlating the Txfcf counter value and the corresponding Rxfcf counter value of the return flow measurement packet, MM 27A (or NMS 8 having received such information from PE 16A) may determine loss measurement between VRF 26A and VRF 26B. In addition, MM 27A (or NMS 8) may use techniques described above to determine overall bandwidth consumption for any of VRF 26 by, e.g., accumulating Tx/Rx counter values for the VRFs. For instance, an administrator may tabulate the received value(s) to perform loss measurement, packet rate calculations, and bandwidth utilization calculations over a period of time.

According to one example of the bandwidth measurement techniques of this disclosure, MM 27A records packet rates at a predetermined time interval, such as at every 10 minutes. In one example, MM 27A is configured to record the packet rates for at least six entries in a buffer. After six entries are recorded, MM 27A may then write the buffered entries to a file, upon receiving entries subsequent to the sixth entry. Additionally, MM 27A may overwrite the file at predetermined time intervals, such as at intervals of every 48 hours. According to some examples in accordance with this disclosure, an NMS may be configured to extract the data written to the file, prior to MM 27A overwriting the data of the file.

Table 2 below illustrates an example use case scenario of bandwidth utilization monitoring implemented by PEs 16, 'PE1' referring to PE 16A and 'PE2' referring to PE 16B. In the example illustrated in Table 2, the multicast group bandwidth utilization for VRFs 28A and 28B ("vrfA of PE1" and "vrfA of PE2") from PE 16A to PE 16B is calculated using the formula (P12'-P12)/600 pps (e.g., 600 referring to 600 seconds or 10 minutes per the above example) and from PE 16B to 16A is calculated using the formula (PE21'-PE21)/600 pps. The resulting bandwidth usage may be expressed in various units, such as packets per second (pps) or bytes per second. In various examples, MM 27A or another device such as NMS 8 (e.g., an administrator-level device) may calculate the bandwidth utilization over a period of time and tabulate the results or plot the results on a graph. In turn, a service provider may use the tabulated or plotted data to discern and analyze the traffic rates associated with each customer site, e.g., with each of VRFs 26B and 26C of PEs 16B and 16C. In some use case scenarios, the service provider may use the bandwidth usage statistics compiled by MM 27A to assign customer status levels to each customer site (in this particular example the sites associated with destination VRFs 26B and 26C). As one example, the service provider may base the determination of preferred customer levels (e.g., "platinum status," "gold status," and so on) on the bandwidth usage statistics gathered and compiled by MM 27A. The techniques may thus provide a clear picture of traffic rates of each customer VRF in the PEs 16.

TABLE 2

| Interval | Txfcf (packets transmitted from vrfA of PE1 to PE2 vrfA | Rxfcf (packets received at PE2 from vrfA of PE1 ) | Txfcb (packets transmitted from vrfA of PE2 to PE1 vrfA | Txfcf (packets transmitted from vrfA of PE2 to PE1 vrfA |
|---|---|---|---|---|
| 1 | P12 | P12 | P21 | P21 |
| 2 | P12' | P12' | P21' | P21' |
| 3 | P12" | P12" | P21" | P21" |

MMs 27 may identify flow measurement packets including multicast flow measurement packets by the L4/L3 headers of the flow measurement packets that identify such packets as including flow measurement information. For examples, PEs 16 may be configured to process, by MMs 27, packets that include particular UDP/IP headers as flow measurement packets.

Figure 2:
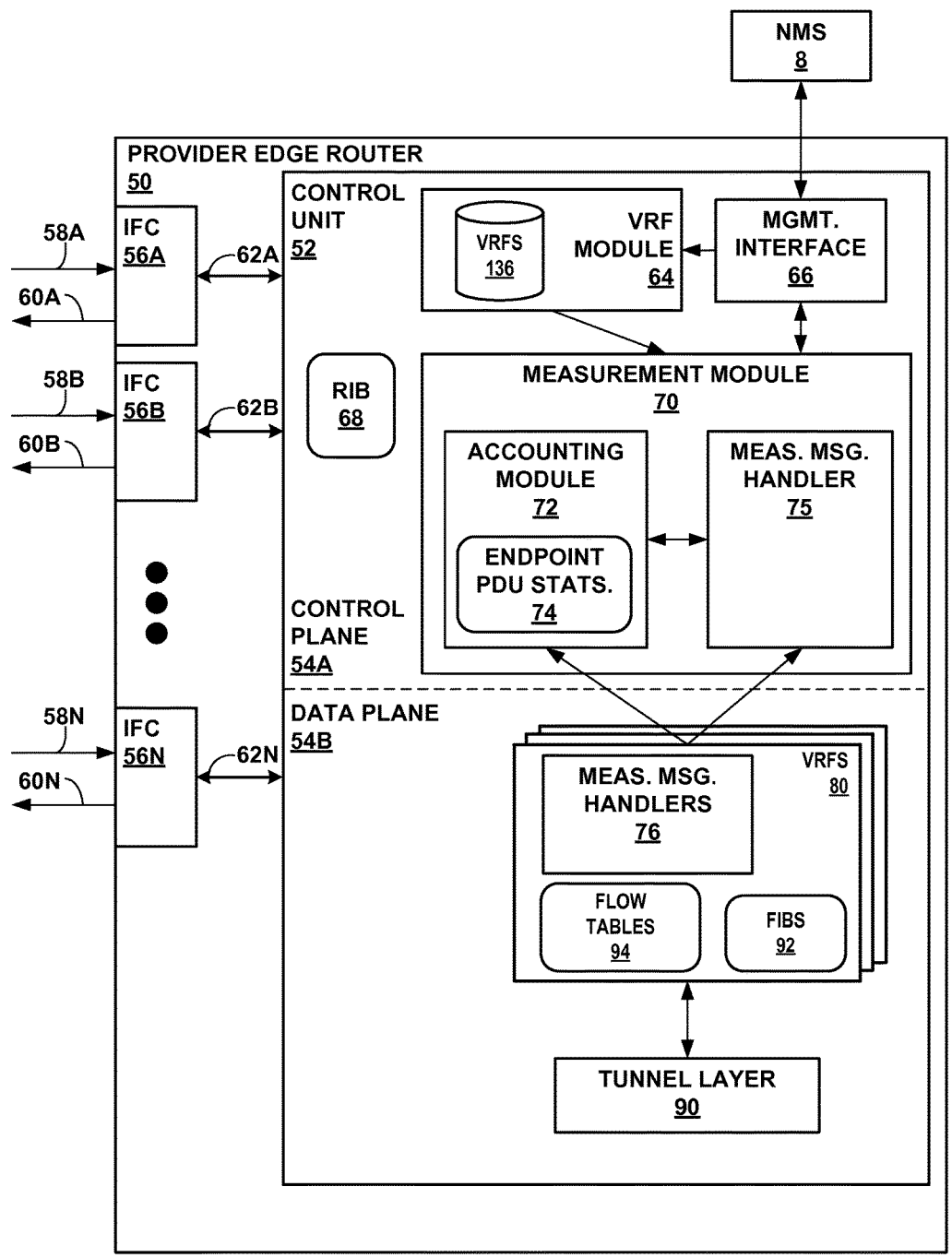
FIG. 2 is a block diagram illustrating example provider edge router that includes endpoints for an IP-VPN or IP-VPN service and implements performance monitoring and/or bandwidth consumption measurement according to techniques described in this disclosure.

FIG. 2 is a block diagram illustrating example provider edge router 50 ("router 50") that includes endpoints for an IP-VPN or IP-VPN service and implements performance monitoring and/or bandwidth consumption measurement according to techniques described in this disclosure. Router 50 is one example implementation of any of PEs 16 illustrated in FIG. 1. Reference to a VPN instance hereinafter may refer to a VPN instance that is an IP-MVPN instance. While router 50 and its components are primarily described with respect to the IP-MVPN examples of this disclosure, it will be appreciated that router 50 may also or alternatively, in various instances, be configured to perform the unicast IP-VPN monitoring techniques of this disclosure as well. For purposes of illustration, router 50 may be described below within the context of an exemplary network system 10 of FIG. 1 that implements tunnels 22 and may represent any one of PEs 16. Moreover, while described with respect to a particular network device, e.g., a router, the techniques may be implemented by any network device that may operate as a service endpoint. The techniques should therefore not be limited to the exemplary embodiments described in this disclosure.

Router 50 includes a control unit 52 and interface cards 56A–56N ("IFCs 56") coupled to control unit 52 via internal links 62A–62N. Control unit 52 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 52 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 52 is divided into two logical or physical "planes" to include a first control or routing plane 54A and a second data (or forwarding) plane 54B. That is, control unit 52 implements two separate functionalities, e.g., the routing and forwarding functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 54A of control unit 52 executes the routing functionality of router 50. In this respect, control plane 54A represents hardware or a combination of hardware and software of control unit 52 that implements routing protocols (not shown in FIG. 2) by which routing information stored in routing information base 68 ("RIB 68") may be determined. RIB 68 may include information defining a topology of a network, such as IP network 12. Control plane 54A may resolve the topology defined by routing information in RIB 68 to select or determine one or more routes through the network. Control plane 54A may then update data plane 54B with these routes, where data plane 54B maintains these routes as forwarding information base (FIB) 92. Forwarding or data plane 54B represents hardware or a combination of hardware and software of control unit 52 that forwards network traffic in accordance with FIB 92.

Control plane 54A further comprises management interface 66 (illustrated as "mgmt. interface 66") by which network management system 8 (illustrated as "NMS 8"), or in some instances an administrator using a command line or graphical user interface, configures in VRF module 64, one or more VRFs 136 for a network to interconnect combinations of customer networks into a single IP domain. For example, network management system 8 may configure router 50 as a participant in a particular VPN instance having one or more associated VPN identifiers. VRF module 64 may perform auto-discovery or other techniques to determine additional PE routers participating in the VPN and additionally performing signaling to establish tunnels between PE 50 and each of the additional PE routers. VRF module 64 may execute Label Distribution Protocol (LDP)- and/or Border Gateway Protocol (BGP)-based techniques to perform the auto-discovery and signaling.

As shown, control plane 54A also includes measurement module 70. Measurement module 70 implements one or more of the IP-VPN service level agreement (SLA) functionalities described herein. Measurement module 70 includes accounting module 72 and measurement message handler 75. Accounting module 72 implements various techniques of this disclosure with respect to obtaining, maintaining, and processing various Ethernet OAM statistics (as provided by the Y.1731 protocol, for instance), with respect to IP communications. In the example of FIG. 2, accounting module 72 includes endpoint PDU statistics 74. In various examples, endpoint PDU statistics 74 may include packet counters and timestamps extracted from encapsulated OAM messages received from data plane 54B. Measurement module 70 may represent an example instance of MMs 27 of FIG. 1 or 2.

Measurement message handler 75 of control plane 54A processes OAM messages received for measured IP traffic flows received from data plane 54B. In various instances, measurement message handler 75 is configured to receive OAM information for selected (e.g., "measured") IP traffic flows. In turn, measurement message handler 75 relays the OAM information to accounting module 72, which populates endpoint PDU statistics 74 with the received OAM data.

Data plane 54B provides high-speed forwarding of network traffic received by interface cards 56 via inbound links 58A-58N. VRFs 80A-80K (collectively, "VRFs 80") and tunnel layer 90 of data plane 54B process and forward received network traffic associated with VPN instances in which router 50 participates in accordance with FIB 92 and flow tables 82. Each of VRFs 80 and tunnel layer 90 represents components of data plane 54B to implement the respective functionalities included in the techniques described herein.

Tunnel layer 90 provides tunneling services over a packet-switched network to additional routers participating in one or more VPN instances. VRF module 64 may perform setup, maintenance, and tear-down signaling for tunnels of the VPN instances. Additionally, VRF module 64 is configured to install, maintain, and manage VRFs 80 illustrated in data plane 54B. Tunnels implemented by tunnel layer 90 may include LSPs as well as GRE and IPsec tunnels. Tunnel layer 90 receives outbound IP traffic flows traffic and a specified tunnel identifier and outputs the traffic in accordance with the specified tunnel.

Data plane 54B includes multiple VRFs 80 for corresponding virtual networks, such as IP-VPNs. VRFs 80 include corresponding forwarding information bases (FIBs) 92A-92K (collectively, "FIBs 92"), flow tables 126A-126K (collectively, "flow tables 126"), and measurement message handlers 76A-76K ("measurement message handlers 76"). Although illustrated as separate data structures, flow tables 94 may in some instances be logical tables implemented as a single table or other associative data structure in which entries for respective flow tables 94 are identifiable by the virtual network identifier (e.g., an MPLS label)). FIBs 92 include lookup tables that map destination addresses to destination next hops. The destination addresses may include layer 3 network prefixes or layer 2 MAC addresses. Flow tables 94 enable application of forwarding policies to flows. Each of flow tables 94 includes flow table entries that each match one or more flows that may traverse data plane 54B and include a forwarding policy for application to matching flows. For example, data plane 54B attempts to match packets processed by any of VRFs 80 to one of the flow table entries of the corresponding flow table 94. If a matching flow table entry exists for a given packet, data plane 54B applies the flow actions specified in a policy to the packet. This may be referred to as "fast-path" packet processing. If a matching flow table entry does not exist for the packet, the packet may represent an initial packet for a new packet flow and data plane 54B may request VRF module 64 to install a flow table entry in the flow table for the new packet flow.

Each of VRFs 80 identify particular IP traffic flows using the corresponding flow table 94. For instance, VRFs 80 may include VRF 26A illustrated in FIG. 1. More specifically, VRFs 80 identify IP traffic flows by matching an incoming packet's UDP and IP header information (such as UDP header 104 and IP header 106 illustrated in FIGS. 3A & 3B), with known UDP and IP header information included in flow tables 94. In instances where an incoming packet also includes an LSP label, the LSP label may identify to data plane 54B the VRF 80 with which to process the label-encapsulated packet.

In various examples in accordance with the techniques of this disclosure, VRFs 80 generate measurement packets to transmit via measurement flows 25A and 25C to respective client VRFs 26B and 26C. For instance, VRFs 80 generate measurement packets that include an encapsulated LMM payload. VRFs 80 include a Txfcf value in the LMM payload that reflects the latest count of transmitted measurement packets for the respective measurement flow 25A or 25C. Additionally, VRFs 80 include an Rxfcf value of zero in the LMM payload.

In turn, VRFs 80 receive return measurement packets over measurement flows 25A and 25C. As described with respect to FIG. 1, each return measurement packets includes an encapsulated LMR payload. In turn, the encapsulated LMR payload includes an updated Rxfcf value that reflects the actual number of measurement packets received by the respective downstream client device. Additionally, each return measurement packet includes a copy of the corresponding Txfcf value from the last measurement packet transmitted by VRFs 80. VRFs 80 may extract the encapsulated LMR payload, thereby obtaining the updated Rxfcf value for the multicast channel that the corresponding measurement flow 25A or 25C is configured to monitor.

By obtaining the updated Rxfcf value in a return measurement packet and the corresponding Txfcf value copied into the return measurement packet, VRFs 80 enable packet loss measurement and bandwidth monitoring on a per-client basis for a multicast channel of the IP-MVPN. In this manner, VRFs 80, in conjunction with various components of router 50, may implement the techniques of this disclosure to provide performance monitoring and bandwidth consumption measurement capabilities with respect to a particular multicast channel, on a per-client basis. As described above, VRFs 80 may, in some examples, be configured to implement the unicast IP-VPN monitoring techniques of this disclosure, as well or in the alternate.

In some embodiments, aspects of data plane 54B are distributed to a number of distributed forwarding units, such as packet forwarding engines, each associated with a different one or more IFCs 56. In these embodiments, measurement message handlers 76 may be distributed to the distributed forwarding units to enable high-speed header attachment and identification and loss measurement message/loss measurement reply filtering within the data plane.

Figure 3:
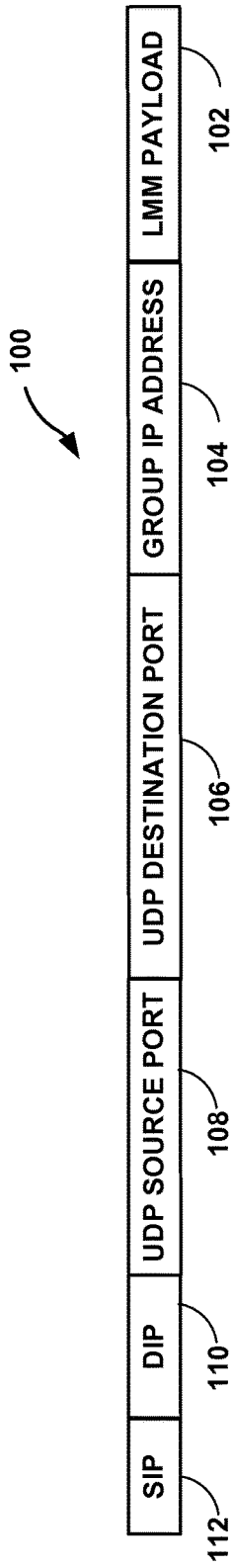
FIG. 3 is a block diagram illustrating the structure of an example multicast measurement packet in accordance with one or more aspects of this disclosure.

FIG. 3 is a block diagram illustrating the structure of an example multicast measurement packet 100 (or "multicast flow measurement packet 100"), in accordance with one or more aspects of this disclosure. Multicast flow measurement packet 100 is an example of a packet that a PE device, such as PE 16A in the examples described above with respect to FIG. 1, generates and transmits in accordance with various performance monitoring techniques of this disclosure. Multicast flow measurement packet 100 is illustrated in FIG. 3 as including information pertaining to the IP-MVPN monitoring techniques of this disclosure. As examples, PE 16A may transmit instances of multicast flow measurement packet 100 to both PEs 16B and 16C in scenarios where PE 16A functions as an ingress PE for the multicast distribution tree in an IP-MVPN. The structure of multicast flow measurement packet 100 includes an LMM payload 102, encapsulated using various header fields, that substantially conforms to structures defined in the Y.1731 protocol.

LMM payload 102 includes information that is typically included in an LMM message, according to the Y.1731 protocol. As described above, LMM payload 102 includes various counter values, including a transmit counter (Txfcf) and a receipt counter (Rxfcf). In the case of multicast flow measurement packet 100, PE 16A (e.g., by MM 27A) sets the Txfcf counter by copying the latest transmit count value from the PE 16A forwarding plane, and updating the Txfcf counter value to match the copied transmit count. Additionally, PE 16A sets the Rxcfc to a default value of zero.

As shown in FIG. 3, PE 16A encapsulates LMM payload 102 using various header fields, including group IP address 104, UDP destination port 106, UDP source port 108, destination IP (DIP) 110, and source IP (SIP) 112. PE 16A populates group IP address 104 with a group IP address that identifies the particular multicast channel with which multicast flow measurement packet 100 is associated.

Additionally, PE 16A populates the header field for UDP destination port 106 and UDP source port 108 with the UDP port information. Additionally, VRF 26A may populate the header field for DIP 110 with the IP address of a customer-facing interface of the destination PE 16B or 16C. In this manner, VRF 26A may implement various techniques of this disclosure to communicate LMM data using Y.1731-compliant communications, by encapsulating LMM payload 102 using the combination of header fields illustrated with respect to multicast flow measurement packet 100 in FIG. 3. Although not illustrated for ease of illustration, multicast flow measurement packet 100 may include at least one of an inner MPLS label and outer MPLS label for identifying a VRF at the receiving PE or switching according to an LSP/tunnel, respectively.

Figure 4:
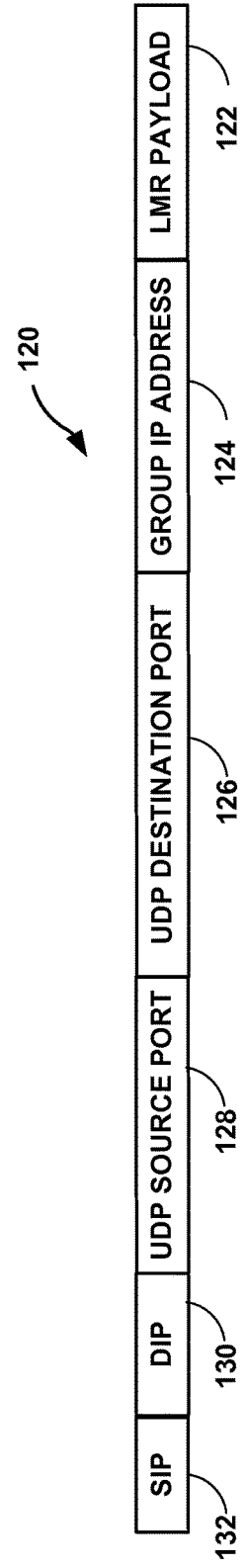
FIG. 4 is a block diagram illustrating the structure of an example return multicast measurement packet according to techniques described in this disclosure.

FIG. 4 is a block diagram illustrating the structure of an example return multicast measurement packet 120 (or "return multicast flow measurement packet 120"), in accordance with one or more aspects of this disclosure. Return measurement packet 120 is an example of a packet that a PE device, such as any of PEs 16 in the examples described above with respect to FIG. 1, generates and transmits a another PE device in response to a multicast flow measurement packet and in accordance with various performance monitoring techniques of this disclosure. Measurement packet 120 is illustrated in FIG. 4 as including information pertaining to the IP-MVPN techniques of this disclosure. The structure of return measurement packet 120 is similar the structure of multicast flow measurement packet 100 illustrated in FIG. 3.

LMR payload 122 includes information that is typically included in an LMR message, according to the Y.1731 protocol. For instance, as described above, LMR payload 122 includes various counter values, including a transmit counter (Txfcf) and a receipt counter (Rxfcf). PE 16B, e.g., may set the Txfcf counter by extracting the Txfcf value from the last measurement packet received over measurement flow 25A, and updates the Txfcf value of LMR payload 122 to reflect the copied Txfcf value.

Additionally, PE 16B obtain, from the PE 16B forwarding plane, a count of packets received by PE 16B and destination for the identified group IP address 104 of the flow measurement packet. PE 16B copies the most recently obtained count of received packets into the Rxfcf value of LMR payload 122. In this way, PE 16B implements the techniques of this disclosure to populate LMR payload 122 using the most up-to-date Txfcf and Rxfcf values for the multicast channel/group traffic. By populating LMR payload with the most up-to-date Txfcf and Rxfcf values, PE 16B enables any entity that inspects LMR payload 122 or the counter data transported therein to derive current statistics for monitoring any one or more of performance, bandwidth consumption, or packet count data.

PE 16B populates the header field for group IP address 124 using the same group IP address as the corresponding header field for group IP address 104 in multicast flow measurement packet 100. By populating the same data in group IP address 124 as was used in group IP address 104, PE 16B enables PE 16A to correlate return multicast flow measurement packet 120 to the appropriate multicast channel. More specifically, by correlating return multicast flow measurement packet 120 to the pertinent multicast channel, PE 16B may enable monitoring of performance and bandwidth metrics with respect to a particular multicast channel.

Additionally, PE 16B may generate the remaining header fields of return multicast flow measurement packet 120 using data that is reciprocal to the data included in the corresponding header fields of multicast flow measurement packet 100. For instance, PE 16B may populate the header fields for UDP destination port 126 and UDP source port 128 by reversing the data in the corresponding UDP fields (106 and 108) of multicast flow measurement packet 100. Similarly, PE 16B may swap the values of DIP 110 and SIP 112 of multicast flow measurement packet 100 to generate the corresponding header fields for DIP 130 and SIP 132 of return multicast flow measurement packet 120 responsive to the instance of multicast flow measurement packet 100 received by PE 16B. More specifically, in the example scenario presently described, VRF 26B populates DIP 130 using the IP address of a customer-facing IP interface for VRF 26A, and populates SIP using a customer-facing IP address for source VRF 26B. Thus, VRF 26B may populate the header fields of return multicast flow measurement packet 120 (fields 126-132) such that return multicast flow measurement packet 120 has endpoints that are reciprocal to the those of multicast flow measurement packet 100. Although not illustrated for ease of illustration, multicast flow measurement packet 120 may include at least one of an inner MPLS label and outer MPLS label for identifying a VRF at the receiving PE or switching according to an LSP/tunnel, respectively.

Figure 5:
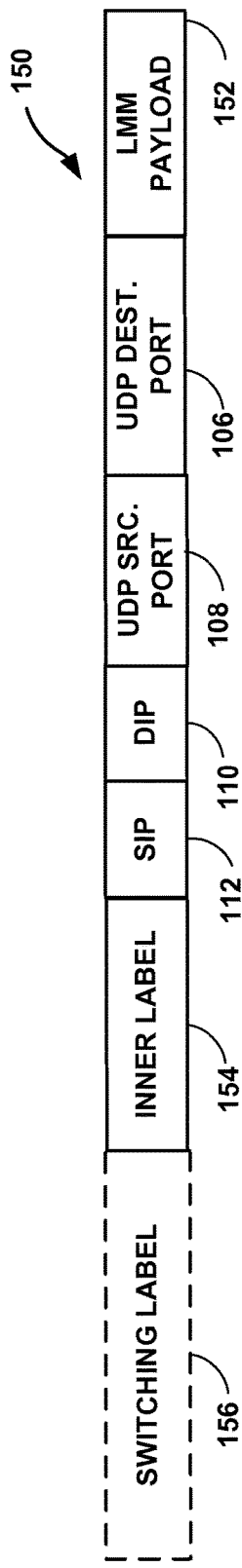
FIG. 5 is a block diagram illustrating the structure of an example flow measurement packet for VRF-based monitoring, in accordance with one or more aspects of this disclosure.

FIG. 5 is a block diagram illustrating the structure of an example flow measurement packet 150 for VRF-based monitoring, in accordance with one or more aspects of this disclosure. Packet 150 is an example of a packet that a PE device, such as PE 16A in the examples described above with respect to FIG. 1, generates and transmits in accordance with various performance monitoring techniques of this disclosure. Packet 150 is illustrated in FIG. 5 as including information pertaining to the VRF-based monitoring techniques of this disclosure. In the example use case scenario described above, PE 16A transmits packet 150 to PE 16B to obtain receipt counter value data for VRF 26B. The structure of packet 150 includes an LMM payload 152 that may conform to structures defined in the Y.1731 protocol. Header fields of packet 150 that are numbered similarly to corresponding header fields of measurement packet 110 of FIG. 3 are not described separately with respect to FIG. 5.

The structure of packet 150 includes, among other fields, two header fields, namely, an inner label 154, and an optional switching label 156. The optional nature of switching label 156 is denoted in FIG. 5 using a dashed-line border. PE 16A may update the Txfcf counter value of LMM payload 152 of packet 150 using the latest count of transmitted packets labeled to identify VRF 26B and obtained from the PE 16A forwarding plane. Additionally, PE 16A may set the Rxfcf counter value of LMM payload 152 to a default value of zero.

VRF 26A may implement the VRF-based monitoring techniques of this disclosure to populate the header field for inner label 154 with an MPLS label that identifies VRF 26B. Keeping with the example unicast VPN scenario described above, PE 16A populates the header field for inner label 154 using a value denoted herein as L1. The value of L1 for inner label 154 may enable PE 16B to identify the flow measurement packet 150 as seeking VRF-based traffic counts for the particular VRF 26B and provide monitoring-related feedback that is pertinent to the corresponding VPN.

Figure 6:
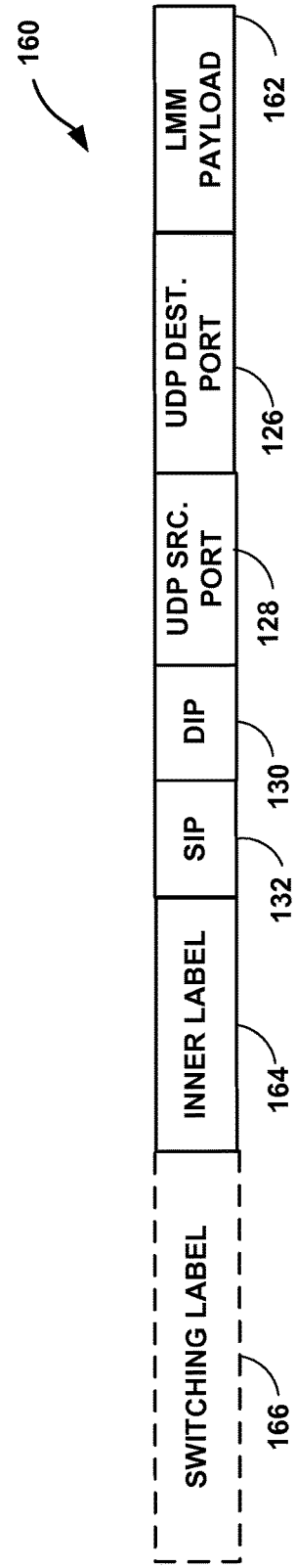
FIG. 6 is a block diagram illustrating the structure of an example return flow measurement packet for VRF-based monitoring, in accordance with one or more aspects of this disclosure.

FIG. 6 is a block diagram illustrating the structure of an example return flow measurement packet 160 for VRF-based monitoring, in accordance with one or more aspects of this disclosure. Return flow measurement packet 160 is an example of a flow measurement packet that a PE device, such as PE 16B in the examples described above with respect to FIG. 1, generates and transmits in response to a received flow measurement packet (e.g., flow measurement packet 150) and in accordance with performance monitoring techniques of this disclosure. Return flow measurement packet 160 is illustrated in FIG. 6 as including information pertaining to the VRF-based monitoring techniques of this disclosure. PE 16B, e.g., may generate and transmit return flow measurement packet 160 in response to receiving packet 150 illustrated in FIG. 5. As shown, the structure of return packet 160 is analogous to the structure of packet 150. Header fields of return packet 160 that are numbered similarly to corresponding header fields of return multicast flow measurement packet 120 of FIG. 4 are not described separately with respect to FIG. 6.

Return multicast flow packet 160 includes an LMR payload 162, encapsulated using header fields similar to those described with respect to measurement packet 150, but with different values. Return multicast flow packet 150 includes an inner label 164 and an optional switching label 166. The optional nature of switching label 166 is denoted in FIG. 6 using a dashed-line border. PE 16B is configured to obtain the Txfcf counter value of the last received instance of a corresponding flow measurement packet 150 and copy the Txfcf counter value into LMR payload 162. Additionally, PE 16B may update the Rxfcf value of LMR payload 162 by obtaining the latest received packet count for L1-labeled packets from the PE 16B forwarding plane and copying the obtained received packet count value into the Rxfcf value of LMR payload 162. For instance, the route from PE 16A to PE 16B for VRF 26B may be referred to as an L1-labeled route, and the return route from PE 16B to PE 16A for VRF 26A may be referred to as an L2-labeled route. Inner label 164 of return multicast flow measurement packet 160 may have a value that identifies VRF 26A to PE 16A.

Figure 7:
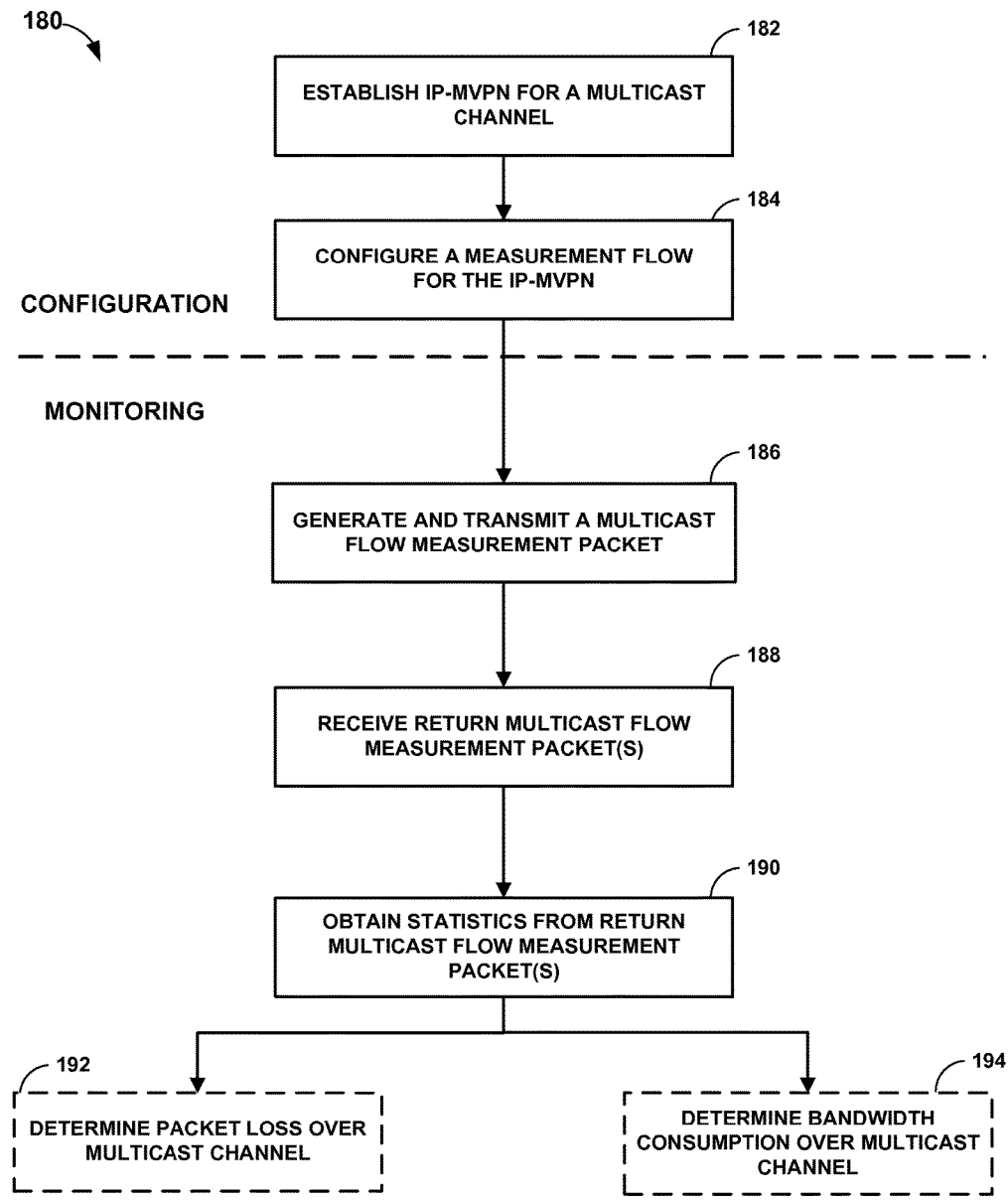
FIG. 7 is a flowchart illustrating an example mode of operation for a PE device configured to operating according to techniques described in this disclosure.

FIG. 7 is a flowchart illustrating an example mode of operation 180 for a PE device configured to implement one or more of the IP-MVPN monitoring techniques of this disclosure. In the example of FIG. 7, operation 180 is conceptually divided into two broad stages, namely, a "configuration" stage and a "monitoring" stage. Operation 180 is described as being performed by PE 16A.

PE 16A establishes an IP-MVPN connection for a particular multicast channel to transmit multicast data sourced by a customer site attached to the IP-MVPN at PE 16A, with destination VRFs 26B and 26C (182). The multicast channel may be defined at least in part by a multicast group address or other group identifier. As described above, PE 16A according to a multicast routing table of VRF 26A transmits the multicast data using the IP-MVPN to at least one of PEs 16B, 16C. Additionally, PE 16A may configures measurement flows 25A and 25C to monitor the IP-MVPN connection (184). By configuring measurement flows 25A and 25C, PE 16A may enable IP-MVPN performance monitoring and/or IP-MVPN bandwidth consumption monitoring in accordance with various aspects of this disclosure.

The "monitoring" stage of operation 180 proceeds with PE 16A generating and transmitting respective instances of measurement packet 100 over each of measurement flows 26B and 26C (186). As described above, VRF 26A generates each instance of multicast flow measurement packet 100 to include an LMM payload 102 and a multicast group address that identifies the IP-MVPN connection. LMM payload 102 includes the latest transmission count, in the form of a Txfcf value, from PE 16A for the IP-MVPN connection. Additionally, PE 16A may set the Rxfcf value (which denotes the number of packets for the IP-MVPN connection received by the destination VRF of multicast flow measurement packet 100) of LMM payload 102 to a value of zero.

PE 16A receives an instance of return multicast flow measurement packet 120 from either PE 16B or 16C over the respective measurement flow 25A or 25C (188). For instance, VRF 26A may receive return measurement packet 120 as a response to the corresponding instance of multicast flow measurement packet 100 that PE 16A transmitted to the respective PE 16B or 16C at (186). In response, PE 16A decapsulates LMR payload 122 of the received return multicast flow measurement packet 120 to obtain statistics pertaining to the IP-MVPN monitoring techniques described herein (190). More specifically, PE 16A obtains the Rxfcf value embedded in LMR payload 122 by the sending PE 16B or 16C. Additionally, PE 16A can also obtain the corresponding Txfcf value that the sending PE 16B or 16C copied into LMR payload 122.

PE 16A may implement one or more optional analysis operations using the statistics obtained from LMR payload 122. The optional nature of various monitoring operations is illustrated using dashed-line borders in FIG. 7. As one example of an optional monitoring operation, PE 16A may determine packet loss over the relevant multicast channel, by determining a difference between the embedded Rxfcf value and the embedded Txfcf value of LMR payload 122 (192). In this manner, PE 16A may implement the IP-MVPN monitoring techniques of this disclosure to determine packet loss and monitor the performance of a particular multicast channel on a per-destination VRF basis.

As another example of an optional monitoring operation, PE 16A may determine bandwidth consumption over the relevant multicast channel associated with the received instance of return multicast flow packet 120 (194). More specifically, PE 16A may determine the individual bandwidth consumption by each of destination VRFs 26B and 26C over the multicast channel. In this manner, PE 16A may implement the IP-MVPN monitoring techniques of this disclosure to determine bandwidth consumption on a per-destination VRF basis over a single multicast channel of an IP-MVPN. The IP-MVPN bandwidth consumption monitoring techniques of this disclosure may enable an administrator to assign customer status levels based on client-specific bandwidth consumption statistics. It will be appreciated that PE 16A may implement one or both the packet loss measurement and bandwidth consumption measurement operations illustrated in FIG. 7, in any order.

Figure 8:
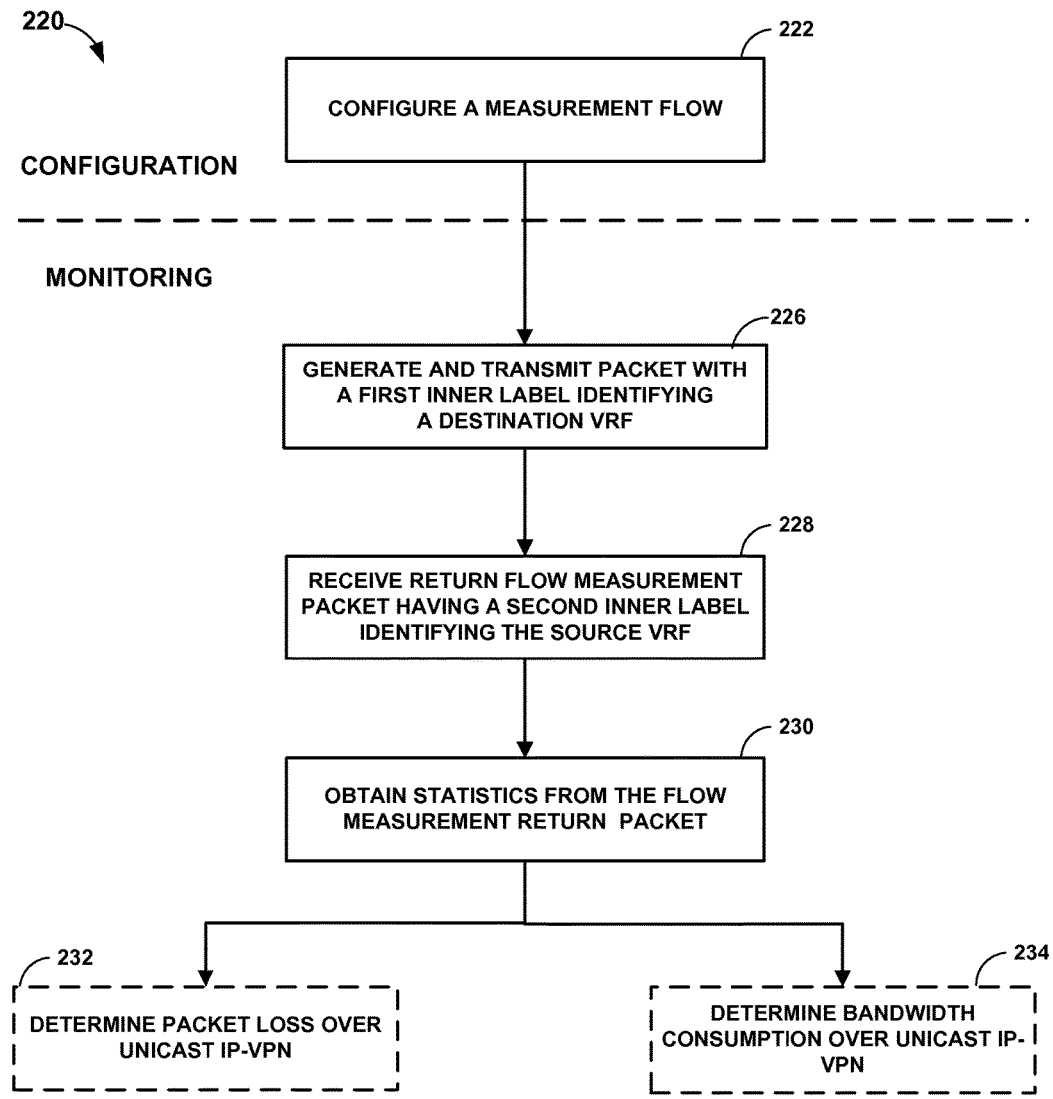
FIG. 8 is a flowchart illustrating an example mode of operation for a PE device configured to operating according to techniques described in this disclosure.

FIG. 8 is a flowchart illustrating an example mode of operation 220 that a PE device may perform to implement one or more of the VRF-based monitoring techniques of this disclosure. In the example of FIG. 8, operation 220 is conceptually divided into two broad stages, namely, a "configuration" stage and a "monitoring" stage.

Process 220 may begin by PE router 16A receiving configuration data for a measurement flow for VRF-based monitoring (222). PE 16A may generate flow measurement packet 150 with an inner label identifying VRF 26B and transmit packet 150 to PE 16B over the corresponding IP-VPN (226). By including the inner label 154 of packet 150, PE 16A may enable IP-VPN performance monitoring and/or unicast IP-VPN bandwidth consumption monitoring at the VRF level of granularity in accordance with various aspects of this disclosure. As described above, PE 16A may embed the latest L1-labeled packet transmission count in the Txfcf portion of LMM payload 152.

PE 16A subsequently receives an instance of return flow measurement packet 160 from PE 16B via the IP-VPN implemented, e.g., using tunnel 22A (228). For instance, PE 16A may receive return flow measurement packet 160 as a response to the corresponding instance of flow measurement packet 150 that PE 16A transmitted to PE 16B using tunnel 22A. PE 16A identifies return flow measurement packet 160 as a response to flow measurement packet 150 based on the value of inner label 164 and the L4/L3 header. PE 16A decapsulates LMR payload 162 of the received return flow measurement packet 160 to obtain statistics pertaining to the unicast IP-VPN monitoring techniques described herein (230). More specifically, PE 16A obtains the Rxfcf value embedded in LMR payload 162 by PE 16B. Additionally, PE 16A can also obtain the corresponding Txfcf value that the sending PE 16B copied into LMR payload 162.

PE 16A can implement one or more optional monitoring operations using the statistics obtained from LMR payload 162. The optional nature of various monitoring operations is illustrated using dashed-line borders in FIG. 8. As one example of an optional monitoring operation, PE 16A may determine packet loss over the unicast IP-VPN of tunnel 22A, by determining a difference between the embedded Rxfcf value and the embedded Txfcf value of LMR payload 162 (232). In this manner, PE 16A may implement the unicast IP-VPN VRF-based monitoring techniques of this disclosure to determine packet loss and monitor the performance of the unicast IP-VPN implemented over tunnel 22A.

As another example of an optional monitoring operation, PE 16A may determine bandwidth consumption by VRF 26B over the unicast IP-VPN of tunnel 22A, using the received instance of return flow measurement packet 160 (234). More specifically, PE 16A may determine the individual bandwidth consumption of destination VRF 26B, based on the statistics included in LMR payload 162. In this manner, PE 16A may implement the unicast IP-VPN monitoring techniques of this disclosure to determine bandwidth consumption by a destination VRF over a unicast IP-VPN connection. The unicast IP-VPN bandwidth consumption monitoring techniques of this disclosure may enable an administrator to assign customer status levels based on client-specific bandwidth consumption statistics. It will be appreciated that PE 16A may implement one or both the packet loss measurement and bandwidth consumption measurement operations illustrated in FIG. 8, in any order.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage medium" refers to physical storage media, (i.e., non-transitory media) and not signals, carrier waves, or other transient media.

What is claimed is:

1. A method comprising:
   receiving, by a router, virtual private network (VPN) routing and forwarding table (VRF) configuration data defining a VRF for a VPN and a VPN address space for the VPN;
   receiving, by the router, configuration data defining a measurement endpoint for measuring performance of a layer 3 (L3) service and associating the measurement endpoint with a remote measurement endpoint of a remote router;
   encapsulating, by the router, to generate a flow measurement packet, a layer 2 (L2) measurement packet in a layer 4 (L4) header and an L3 header,
   wherein the L3 header comprises a source L3 address within the VPN address space and associated with the measurement endpoint, and
   wherein the L3 header comprises a destination L3 address within the VPN address space and associated with the remote measurement endpoint; and
   outputting, by the router, the flow measurement packet to the remote router.

2. The method of claim 1, wherein the flow measurement packet comprises a multicast flow measurement packet that includes the layer 3 (L3) measurement packet and a multicast group address encapsulated in the layer 4 (L4) header and the L3 header.

3. The method of claim 2, wherein the multicast group address is within the VPN address space for the VPN.

4. The method of claim 2,
   wherein the VRF comprises a multicast routing table for the VPN, and
   wherein the router forwards multicast packets to the multicast group address according to the multicast routing table for the VPN.

5. The method of claim 2, wherein the L2 measurement packet comprises a packet count value that indicates a number of multicast packets addressed to the multicast group address and forwarded by the router according to the VRF.

6. The method of claim 2,
   wherein the generated multicast flow measurement packet is a first multicast flow measurement packet,
   wherein the L2 measurement packet comprises a first L2 measurement packet,
   wherein the L3 header comprises a first L3 header, and
   wherein the L4 header comprises a first L4 header, the method further comprising:
   receiving, by the router from the remote router, a second multicast flow measurement packet that includes a second L2 measurement packet encapsulated in a second L4 header and a second L3 header, wherein the second L2 measurement packet includes a metric associated with the measurement flow;
   extracting the metric from the second multicast flow measurement packet; and
   determining a performance statistic for the multicast group address based on the extracted metric.

7. The method of claim 6,
   wherein the metric comprises a received packet count value that indicates a number of multicast packets addressed to the multicast group address and received by the remote router,
   wherein determining the performance statistic comprises comparing the received packet count value to a transmitted packet count value that that indicates a number of multicast packets addressed to the multicast group address and forwarded by the router.

8. The method of claim 6,
   wherein determining the performance statistic comprises comparing the extracted packet count to an actual received packet count associated with the measurement flow.

9. The method of claim 1, wherein the L2 measurement packet comprises a Y.1731 loss measurement message (LMM) and the measurement endpoint comprises a Y.1731 maintenance association endpoint.

10. The method of claim 1, wherein the measurement flow comprises a User Data Protocol (UDP)/Internet Protocol (IP) flow.

11. The method of claim 1, further comprising:
    receiving, by the router, a labeled route for a destination prefix reachable by the remote router, wherein the labeled route is associated with a Multiprotocol Label Switching (MPLS) label and the VRF; and
    determining, by the router, a packet count value indicating a number of packets sent by the router to the remote router according to the labeled route,
    wherein the L2 measurement packet comprises the packet count value.

12. The method of claim 11,
    wherein the L2 measurement packet comprises a Y.1731 loss measurement message (LMM) that includes the packet count value, and wherein the measurement endpoint comprises a Y.1731 maintenance association endpoint.

13. The method of claim 1,
receiving, by the router, a labeled route for a destination prefix reachable by the remote router, wherein the labeled route is associated with a Multiprotocol Label Switching (MPLS) label; and
determining, by the router, a value indicating an amount of packet data sent by the router to the remote router according to the labeled route,
wherein the L2 measurement packet comprises the value.

14. The method of claim 13,
wherein the L2 measurement packet comprises a Y.1731 loss measurement message (LMM) that includes the value, and
wherein the measurement endpoint comprises a Y.1731 maintenance association endpoint.

15. The method of claim 1,
wherein the generated flow measurement packet is a first flow measurement packet,
wherein the L3 header comprises a first L3 header, and
wherein the L4 header comprises a first L4 header, the method further comprising:
receiving, by the router, a second flow measurement packet that includes a L2 measurement packet encapsulated in a second L4 header and a second L3 header, wherein the second flow measurement packet includes a metric associated with the measurement flow;
extracting the metric from the second flow measurement packet; and
determining a performance statistic for the measurement flow based on the extracted metric.

16. A router comprising:
a memory; and
a control unit comprising a processor, the control unit being configured to:
receive virtual private network (VPN) routing and forwarding table (VRF) configuration data defining a VRF for a VPN and a VPN address space for the VPN;
receive configuration data defining a measurement endpoint for measuring performance of a layer 3 (L3) service and associating the measurement endpoint with a remote measurement endpoint of a remote router;
encapsulate, to generate a flow measurement packet, a layer 2 (L2) measurement packet in a layer 4 (L4) header and an L3 header,
wherein the L3 header comprises a source L3 address within the VPN address space and associated with the measurement endpoint, and
wherein the L3 header comprises a destination L3 address within the VPN address space and associated with the remote measurement endpoint; and
output the flow measurement packet to the remote router.

17. The router of claim 16, wherein the flow measurement packet comprises a multicast flow measurement packet that includes the layer 3 (L3) measurement packet and a multicast group address encapsulated in the layer 4 (L4) header and the L3 header.

18. The router of claim 17, wherein the multicast group address is within the VPN address space for the VPN.

19. The router of claim 17,
wherein the VRF comprises a multicast routing table for the VPN, and wherein the router forwards multicast packets to the multicast group address according to the multicast routing table for the VPN.

20. The router of claim 17, wherein the L2 measurement packet comprises a packet count value that indicates a number of multicast packets addressed to the multicast group address and forwarded by the router according to the VRF.

21. The router of claim 17,
wherein the generated multicast flow measurement packet is a first multicast flow measurement packet,
wherein the L2 measurement packet comprises a first L2 measurement packet,
wherein the L3 header comprises a first L3 header, and
wherein the L4 header comprises a first L4 header, the control unit being further configured to:
receive, from the remote router, a second multicast flow measurement packet that includes a second L2 measurement packet encapsulated in a second L4 header and a second L3 header, wherein the second L2 measurement packet includes a metric associated with the measurement flow;
extract the metric from the second multicast flow measurement packet; and
determine a performance statistic for the multicast group address based on the extracted metric.

22. The router of claim 21,
wherein the metric comprises a received packet count value that indicates a number of multicast packets addressed to the multicast group address and received by the remote router, and
wherein determining the performance statistic comprises comparing the received packet count value to a transmitted packet count value that that indicates a number of multicast packets addressed to the multicast group address and forwarded by the router.

23. The router of claim 21, wherein, to determine the performance statistic, the control unit is configured to compare the extracted packet count to an actual received packet count associated with the measurement flow.

24. The router of claim 16, wherein the L2 measurement packet comprises a Y.1731 loss measurement message (LMM) and the measurement endpoint comprises a Y.1731 maintenance association endpoint.

25. The router of claim 16, wherein the measurement flow comprises a User Data Protocol (UDP)/Internet Protocol (IP) flow.

26. The router of claim 16, the control unit being further configured to:
receive a labeled route for a destination prefix reachable by the remote router, wherein the labeled route is associated with a Multiprotocol Label Switching (MPLS) label and the VRF; and
determine a packet count value indicating a number of packets sent by the router to the remote router according to the labeled route,
wherein the L2 measurement packet comprises the packet count value.

27. The router of claim 16,
wherein the L2 measurement packet comprises a Y.1731 loss measurement message (LMM) that includes the packet count value, and
wherein the measurement endpoint comprises a Y.1731 maintenance association endpoint.

28. The router of claim 16, the control unit being further configured to:

receive a labeled route for a destination prefix reachable by the remote router, wherein the labeled route is associated with a Multiprotocol Label Switching (MPLS) label; and determine a value indicating an amount of packet data sent by the router to the remote router according to the labeled route, wherein the L2 measurement packet comprises the value.

29. The router of claim 28, wherein the L2 measurement packet comprises a Y.1731 loss measurement message (LMM) that includes the value, and wherein the measurement endpoint comprises a Y.1731 maintenance association endpoint.

30. The router of claim 16, wherein the generated flow measurement packet is a first flow measurement packet, wherein the L3 header comprises a first L3 header, and wherein the L4 header comprises a first L4 header, the control unit being further configured to:

receive a second flow measurement packet that includes a L2 measurement packet encapsulated in a second L4 header and a second L3 header, wherein the second flow measurement packet includes a metric associated with the measurement flow;

extract the metric from the second flow measurement packet; and determine a performance statistic for the measurement flow based on the extracted metric.

31. A non-transitory computer-readable storage medium encoded with instructions that, when executed, cause one or more processors of a router to:

receive virtual private network (VPN) routing and forwarding table (VRF) configuration data defining a VRF for a VPN and a VPN address space for the VPN;

receive configuration data defining a measurement endpoint for measuring performance of a layer 3 (L3) service and associating the measurement endpoint with a remote measurement endpoint of a remote router;

encapsulate, to generate a flow measurement packet, a layer 2 (L2) measurement packet in a layer 4 (L4) header and an L3 header, wherein the L3 header comprises a source L3 address within the VPN address space and associated with the measurement endpoint, and wherein the L3 header comprises a destination L3 address within the VPN address space and associated with the remote measurement endpoint; and output the flow measurement packet to the remote router.

* * * * *